United States Patent
Kitamura

(10) Patent No.: US 7,835,109 B2
(45) Date of Patent: Nov. 16, 2010

(54) TAPE GUIDING MECHANISM, MAGNETIC TAPE APPARATUS, AND METHOD FOR MANUFACTURING MAGNETIC TAPE

(75) Inventor: Kouta Kitamura, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 849 days.

(21) Appl. No.: 11/790,168

(22) Filed: Apr. 24, 2007

(65) Prior Publication Data
US 2007/0285840 A1    Dec. 13, 2007

(30) Foreign Application Priority Data
Apr. 25, 2006  (JP) ............... 2006-120624

(51) Int. Cl.
    *G11B 15/43*    (2006.01)
(52) U.S. Cl. ........................................... 360/95
(58) Field of Classification Search ............... None
    See application file for complete search history.

(56) References Cited

U.S. PATENT DOCUMENTS

| | | | | |
|---|---|---|---|---|
| 3,405,855 A | * | 10/1968 | Daly et al. ............... | 242/615.4 |
| 4,427,166 A | * | 1/1984 | Oishi et al. ............... | 242/346.2 |
| 5,199,168 A | * | 4/1993 | Daly .......................... | 29/895.3 |
| 5,218,501 A | * | 6/1993 | Sellke .................... | 360/130.21 |
| 6,744,593 B1 | * | 6/2004 | Nayak et al. ................... | 360/95 |
| 6,745,976 B1 | * | 6/2004 | Marion .................... | 242/615.4 |
| 7,116,520 B2 | * | 10/2006 | Tanaka ................... | 360/130.21 |
| 7,460,332 B2 | * | 12/2008 | Eaton et al. .................... | 360/93 |
| 2005/0207062 A1 | * | 9/2005 | Johnson ................. | 360/130.21 |

FOREIGN PATENT DOCUMENTS

JP    2005-259239 A    9/2005

* cited by examiner

*Primary Examiner*—Mark Blouin
(74) *Attorney, Agent, or Firm*—Sughrue Mion, PLLC

(57) ABSTRACT

A tape guiding mechanism for guiding a traveling tape is provided including a guide roller for guiding the traveling tape and a regulator which rubs against at least one edge of the traveling tape in its width direction, in which the guide roller includes a circumferential surface with which the tape is in contact, a spiral groove is formed on the circumferential surface around an axis of the guide roller, and the traveling tape shifts to one side in a width direction on the circumferential surface of the guide roller.

14 Claims, 9 Drawing Sheets

OUTER SIDE ⟵⟶ PANEL SIDE

OUTER SIDE ⟵⟶ PANEL SIDE

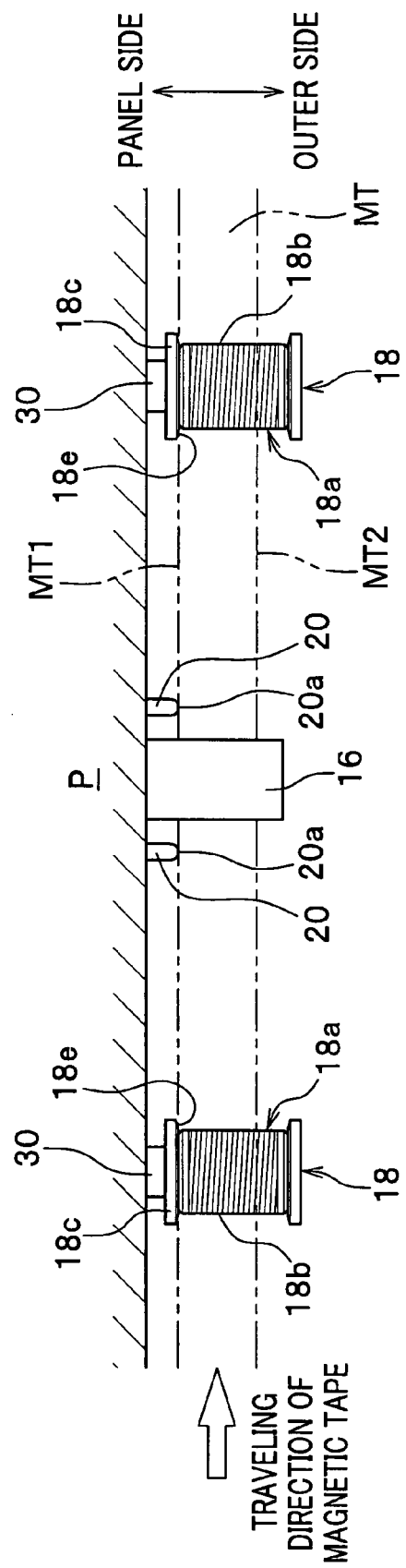

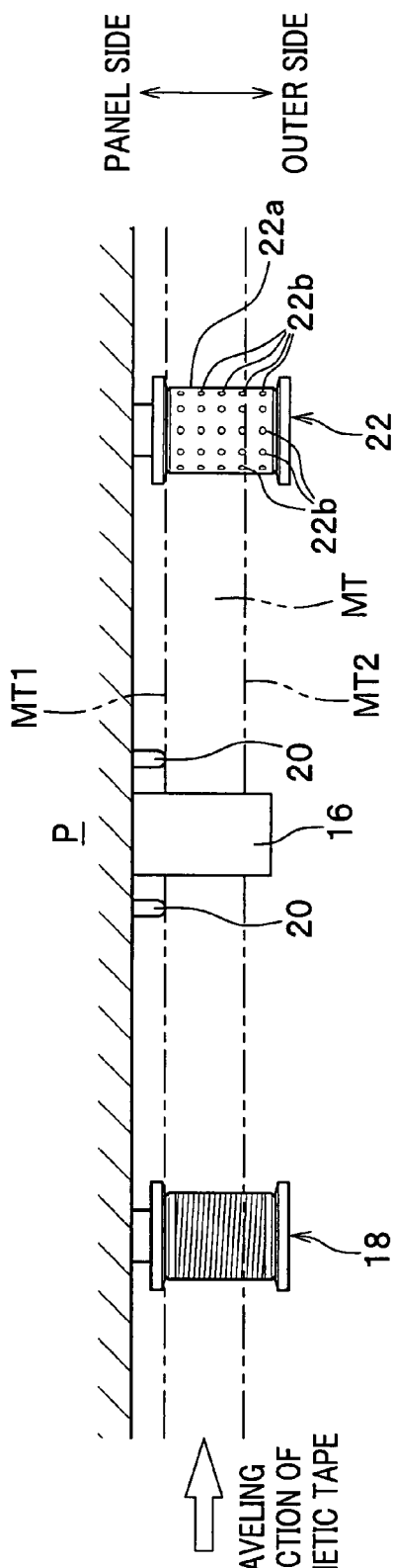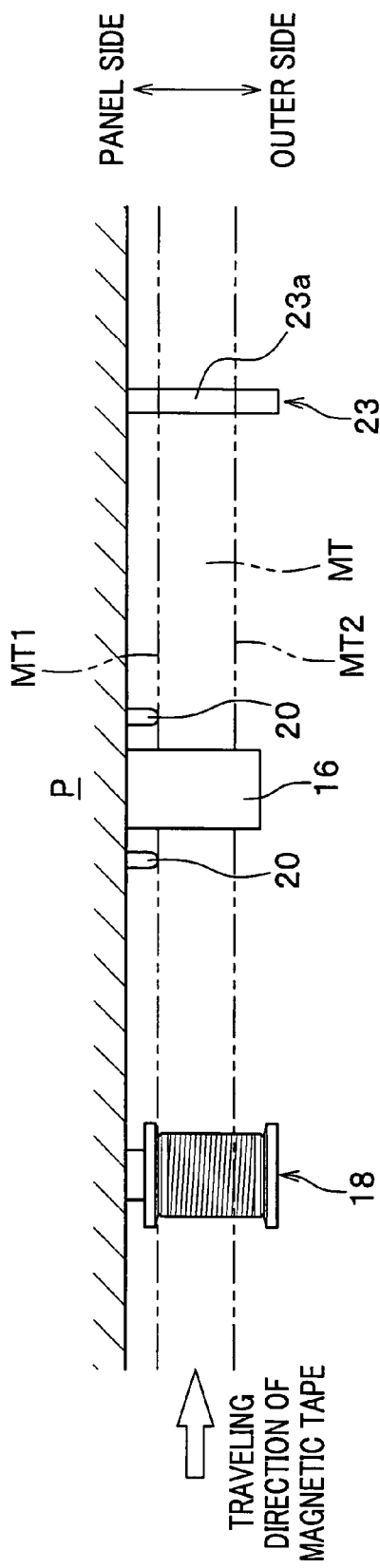

TAPE GUIDING MECHANISM, MAGNETIC TAPE APPARATUS, AND METHOD FOR MANUFACTURING MAGNETIC TAPE

CROSS REFERENCE TO RELATED APPLICATIONS

This application claims the foreign priority benefit under Title 35, United States Code, §119(a)-(d) of Japanese Patent Application No. 2006-120624, filed on Apr. 25, 2006 in the Japan Patent Office, the disclosure of which is herein incorporated by reference in its entirety.

BACKGROUND OF THE INVENTION FIELD OF THE INVENTION

1. Field of the Invention

The present invention relates to a tape guiding mechanism for guiding a tape such as a magnetic tape, a magnetic tape apparatus for reading/writing a magnetic tape, and a method for manufacturing a magnetic tape.

2. Description of the Related Art

High density writing has recently advanced with regard to magnetic tapes, and some magnetic tapes used for backing up computers have a storage capacity of approximately 400 giga bytes. For this purpose, magnetic tape has several hundred data tracks formed in its width direction. Accordingly, the width of each data track is very narrow, and the interval between adjacent data tracks is also narrow. For this reason, in order to make the reading/writing element of a magnetic head trace the data track, its position (the position of the magnetic tape in its width direction) is servo-controlled by pre-written servo signals on the magnetic tape, which are read by the magnetic head.

Also, as shown in FIG. 10, as a servo writer for writing the a servo signal on the magnetic tape, there exists a servo writer 100 including a magnetic tape transport system in which a magnetic tape MT fed from a feed reel 11 is taken up by a take-up reel 12 to thereby travel, a servo signal writing head 16 for writing a servo signal on the magnetic tape MT, and a tension adjuster 13 for adjusting a tension of the traveling magnetic tape MT, (see Japanese published unexamined patent application No. 2005-259239, for instance).

The tension adjuster 13 provides a longitudinal directional tension to the magnetic tape MT to prevent the traveling magnetic tape MT from swaying, and may have a configuration in which the longitudinal directional tension is provided to the magnetic tape MT by, for example, vacuuming a portion of the traveling magnetic tape MT, or moving a tension roller, on which the magnetic tape MT travels, to thereby draw in a portion of the magnetic tape.

Also, the conventional servo writer 100 described above is provided with a plurality of guide rollers 19 for guiding the traveling magnetic tape MT. Each of the guide rollers 19 includes a cylindrical roller body with a circumferential surface for guiding the traveling magnetic tape MT, and is arranged between the feed reel 11 and the take-up reel 12.

In the conventional servo writer 100 described above, an edge of the traveling magnetic tape MT rubs against flange parts of the guide rollers 19 so that the traveling position of the magnetic tape MT is regulated. Thus, if the edge of the magnetic tape MT is curved in its longitudinal direction, the magnetic tape MT sways in a width direction of the tape along the curvature of the edge. Consequently, written servo signals deviate in the width direction of the tape, so as to increase a PES (Position Error Signal) which indicates fluctuation of a displacement amount of the signal written on the magnetic tape MT. This then causes a servo signal read error in a magnetic tape reader/writer, resulting in a problem of being unable to accurately regulate the position of the magnetic head.

Also in the conventional servo writer 100 described above, the edge of the traveling magnetic tape MT scrapes against a part of the tension adjuster 13, thereby causing vibrations of the magnetic tape MT. Then, vibrations of the magnetic tape MT which occur in the tension adjuster 13 are propagated in its longitudinal direction, and the effect of vibrations causes a longitudinal directional fluctuation in the servo signals written on the magnetic tape MT.

Furthermore, in each of the guide rollers 19 for guiding the magnetic tape MT to travel, air flowing around the traveling magnetic tape MT (hereinafter also referred to as "accompanying air") intrudes between the magnetic tape MT and the roller body, and the accompanying air then causes an air layer between the magnetic tape MT and the roller body, whereby the magnetic tape MT travels while floating above the circumferential surface of the roller body. Thus, the traveling magnetic tape MT does not come into contact with the roller body of the guide rollers 19, whereby the magnetic tape MT is likely to sway in the width direction of the tape on the circumferential surface of the roller body, and vibrations which occur in the magnetic tape MT pass through a part guided by the guide rollers 19 to be thereby propagated in the longitudinal direction of the magnetic tape MT.

It is therefore an objective of the present invention to solve the above-described problems and provide a tape guiding mechanism with which a tape can stably travel in the appropriate position and propagation of vibrations which occur in the traveling tape can be prevented.

Another objective is to provide a magnetic tape apparatus capable of accurately writing a signal or data on a magnetic tape, or accurately reading a signal or data from the magnetic tape.

Still another objective is to provide a method for manufacturing a magnetic tape that enables a servo signal to be accurately written on the magnetic tape.

SUMMARY OF THE INVENTION

In order to solve the above-described problems, in one aspect of the present invention, there is provided a tape guiding mechanism for guiding a traveling tape, including a guide roller for guiding the traveling tape and a regulator which rubs against at least one edge of the traveling tape in a width direction of the traveling tape. In the tape guiding mechanism, the guide roller includes a circumferential surface with which the traveling tape is in contact. In addition, a spiral groove is formed on the circumferential surface around an axis of the guide roller. Moreover, the traveling tape shifts to one side in the width direction on the circumferential surface of the guide roller.

Forming the groove on the circumferential surface of the guide roller as described above allows accompanying air (air flowing around the traveling tape) intruding between the traveling tape and the guide roller to be discharged outside through the groove formed on the circumferential surface of the guide roller, whereby the traveling tape comes into contact with the circumferential surface of the guide roller. If there exists a difference between a traveling speed of the tape and a rotational speed of the guide roller while the traveling tape comes into contact with the guide roller as described, a slip occurs between a surface of the tape and the circumferential surface of the guide roller, and a frictional resistance force therebetween causes a tension to act on the tape from the guide roller.

Specifically, if the rotational speed of the guide roller is lower than the traveling speed of the tape, the tension acts on the tape from the guide roller, backward in a traveling direction, whereas if the rotational speed of the guide roller is higher than the traveling speed of the tape, the tension acts on the tape from the guide roller, forward in the traveling direction.

Also, the groove is formed in a spiral manner around the axis of the guide roller, and on the circumferential surface of the guide roller, a part that comes into contact with the tape other than the groove is also formed along the groove in a spiral manner, so that the tension acting on the tape from the guide roller acts obliquely with respect to the traveling direction of the tape along a slope direction of the groove, and the traveling tape shifts to one side in the width direction on the circumferential surface of the guide roller.

Furthermore, the tape guiding mechanism of the present invention is provided with the regulator which rubs against at least one edge of the traveling tape in its width direction, and the shift of the tape to the one side allows the one edge of the tape in its width direction to be pressed by the regulator, and thereby the traveling tape can stably travel in an appropriate position.

Still furthermore, the accompanying air intruding between the traveling tape and the guide roller is discharged outside through the groove formed on the circumferential surface of the guide roller, and thereby the traveling tape comes into contact with the circumferential surface of the guide roller, so that propagation of vibrations which occur in the tape can be prevented.

In the tape guiding mechanism, the regulator may be formed in a bar-like shape. Moreover, an outer end surface of the regulator may be a convex curved surface.

In the tape guiding mechanism, the regulator may be made of ceramic.

In the tape guiding mechanism, the regulator may be made of zirconia.

In the tape guiding mechanism, an outer end surface of the regulator may be formed flat along a traveling direction of the magnetic tape.

In the tape guiding mechanism, a cross-sectional shape of the groove in the guide roller may be V-shaped.

In the tape guiding mechanism, a cross-sectional shape of the groove in the guide roller may be a rectangular.

In the tape guiding mechanism, a cross-sectional shape of the groove in the guide roller may be a semicircular.

In another aspect of the present invention, there is provided a magnetic tape apparatus for reading and/or writing a magnetic tape, including a magnetic tape transport system in which a take-up reel takes up the magnetic tape fed from a feed reel, to cause the magnetic tape to travel, a magnetic head for reading and/or writing the traveling magnetic tape, and a tape guiding mechanism for guiding the traveling magnetic tape. The tape guiding mechanism includes a guide roller for guiding the traveling magnetic tape and a regulator which rubs against at least one edge of the traveling tape in a width direction of the traveling magnetic tape. In the magnetic tape apparatus, the guide roller includes a circumferential surface with which the traveling tape is in contact. In addition, a spiral groove is formed on the circumferential surface around an axis of the guide roller. Moreover, the traveling magnetic tape shifts to one side in the width direction on the circumferential surface of the guide roller. In the magnetic tape apparatus, the regulator is provided between the guide roller and the magnetic head.

This configuration allows the traveling magnetic tape to shift to one side in a width direction on a circumferential surface of the guide roller, whereby at least one edge of the magnetic tape in a width direction of the traveling magnetic tape is pressed by the regulator and thereby the traveling magnetic tape is positioned, so that the magnetic tape can linearly and stably travel in a position appropriate to the magnetic head.

Also, the regulator is provided between the guide roller and the magnetic head, and bringing the regulator and the magnetic head close to each other enables the magnetic tape to be more stable when the magnetic tape passes the magnetic head.

Furthermore, the traveling magnetic tape comes into contact with the guide roller and thereby propagation of vibrations which occur in the magnetic tape can be prevented, so that the effect of vibrations on reading or writing by the magnetic head can be prevented.

In the above-described magnetic tape apparatus, the magnetic head may include a sliding surface on which the traveling magnetic tape slides, and the sliding surface is sloped in such a way that another side of the sliding surface protrudes with respect to the one side in the width direction of the magnetic tape.

The sliding surface of the magnetic head is sloped in such a way that it protrudes on the other side with respect to one side of the magnetic tape in its width direction as described above. Therefore, the traveling magnetic tape is likely to shift to one side in the width direction on the sliding surface. That is, the traveling magnetic tape is likely to shift to a regulator side, so that at least one edge of the magnetic tape in its width direction can surely be pressed by the regulator.

In the magnetic tape apparatus, the sliding surface of the magnetic head may be sloped to cause the traveling magnetic tape to shift to a side of the regulator.

In the magnetic tape apparatus, an angle of the sloped sliding surface of the magnetic head may be 0.8 degree at a maximum.

In another aspect of the present invention, there is provided a method for manufacturing a magnetic tape using a servo writer including a magnetic tape transport system in which a take-up reel takes up the magnetic tape fed from a feed reel, to cause the magnetic tape to travel, a servo signal writing head for writing a servo signal for performing a tracking control of a magnetic head, and a tape guiding mechanism for guiding the traveling magnetic tape. The tape guiding mechanism includes a guide roller for guiding the traveling magnetic tape and a regulator which rubs against at least one edge of the traveling tape in a width direction of the traveling magnetic tape. In the tape guiding mechanism, the guide roller includes a circumferential surface with which the traveling tape is in contact. In addition, a spiral groove is formed on the circumferential surface around an axis of the guide roller. Moreover, the traveling magnetic tape shifts to one side in the width direction on the circumferential surface of the guide roller. In the servo writer, the regulator is provided between the guide roller and the servo signal writing head. The method for manufacturing the magnetic tape using the servo writer includes the steps of making the magnetic tape travel from the feed reel to the take-up reel by the magnetic tape transport system and writing a servo signal on a servo band of the magnetic tape by the servo signal writing head while guiding the traveling magnetic tape by the tape guiding mechanism.

This configuration allows the traveling magnetic tape to shift to one side in a width direction on a circumferential surface of the guide roller, whereby at least one edge of the magnetic tape in its width direction is pressed by the regulator and thereby the traveling magnetic tape can linearly and stably travel in a position appropriate to the servo signal writing head.

Also, the regulator is provided between the guide roller and the servo signal writing head, and bringing the regulator and the servo signal writing head close to each other enables the magnetic tape to be more stable when the magnetic tape slides on the servo signal writing head.

Further, the traveling magnetic tape comes into contact with the guide roller and thereby propagation of vibrations which occur in the magnetic tape can be prevented, so that the effect of vibrations on writing of the servo signal can be prevented.

In another aspect of the present invention, there is provided a tape guiding mechanism for guiding a traveling tape, including a guide roller for guiding the traveling tape and a regulator which rubs against at least one edge of the traveling tape in its width direction. In the tape guiding mechanism, the guide roller includes a circumferential surface with which the tape is in contact. In addition, a plurality of air blow-off holes are formed on the circumferential surface around an axis of the guide roller.

BRIEF DESCRIPTION OF THE DRAWINGS

The object and features of the present invention will become more readily apparent from the following detailed description taken in conjunction with the accompanying drawings in which:

FIG. 3 is a plan view illustrating a tape guiding mechanism of the embodiment;

FIG. 7A is a plan view illustrating a tape guiding mechanism in another embodiment in a case where a guide roller without a groove is provided on a downstream side;

FIG. 7B is a plan view illustrating a tape guiding mechanism in another embodiment in a case where a guide pole is provided on a downstream side;

DESCRIPTION OF THE PREFERRED EMBODIMENTS

An embodiment of the present invention is now described in detail with reference to the drawings as needed.

In the embodiment, a servo writer for writing a servo signal on a magnetic tape will be described, and then a method for manufacturing the magnetic tape with the use of the servo writer will be described.

Here, an upstream side and a downstream side in the following description indicate those in a traveling direction of the magnetic tape.

[Configuration of Servo Writer]

Figure 1:
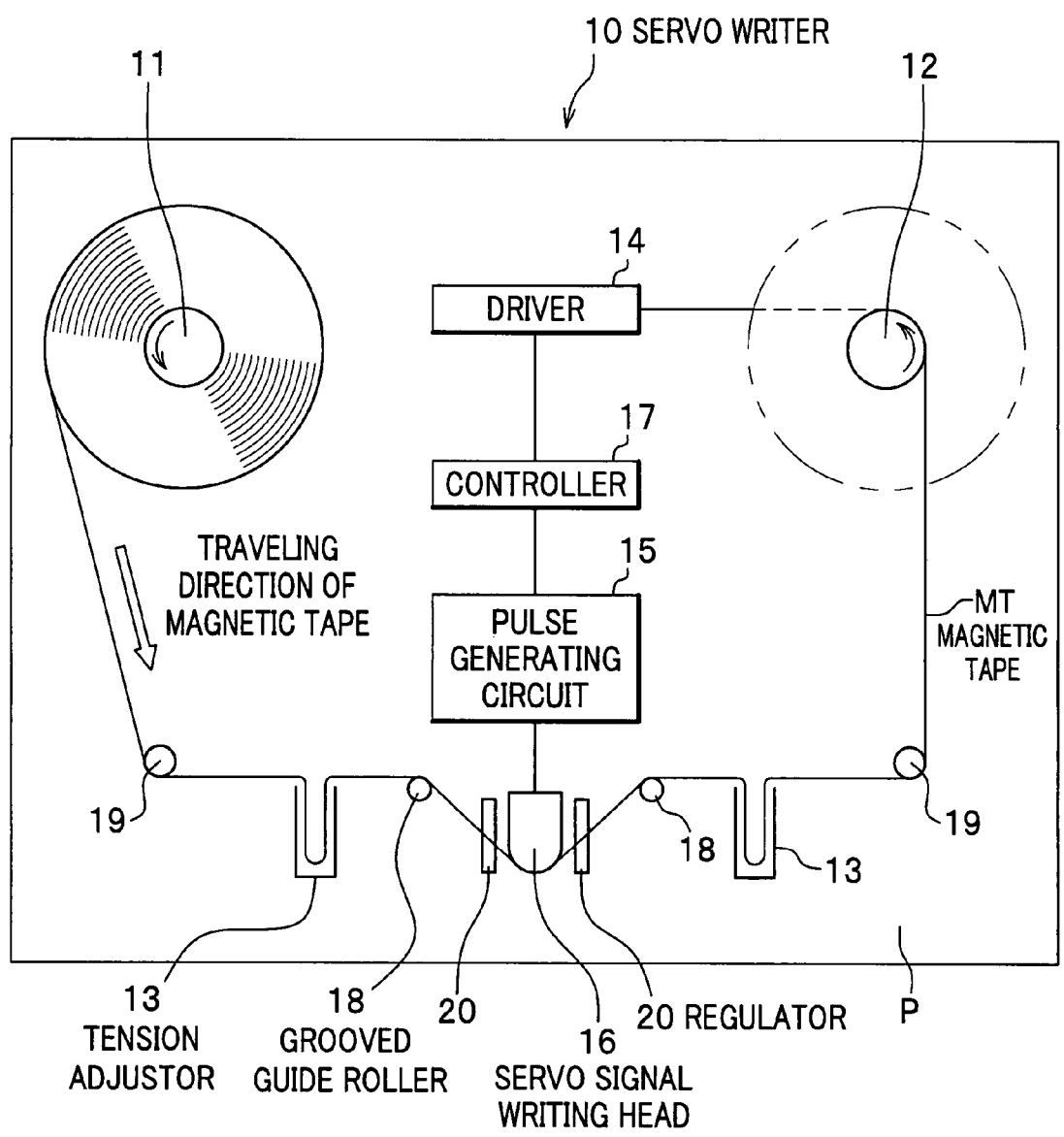
FIG. 1 is a configuration diagram illustrating a servo writer of an embodiment.

FIG. 1 is a configuration diagram illustrating a servo writer of an embodiment. The servo writer 10 shown in FIG. 1 is a device for writing a servo signal on a servo band of a magnetic tape MT, and includes a feed reel 11, a take-up reel 12, a driver 14, a tension adjuster 13, a pulse generating circuit 15, a servo signal writing head 16, and a controller 17.

The servo writer 10 is provided with grooved guide rollers 18 and guide rollers 19, both for guiding the traveling magnetic tape MT. Further, on the upstream and downstream sides of the servo signal writing head 16, regulators 20 for positioning the traveling magnetic tape MT are provided.

In addition, the grooved guide rollers 18 and the regulators 20 described above correspond to a "tape guiding mechanism" described in Claims.

Moreover, each of the above-described components of the servo writer 10 is mounted on a front surface of a panel P. In the following description, a panel P side corresponds to "one side in a width direction" in Claims. On the other hand, an outer side corresponds to "another side of the sliding surface" in Claims, and indicates a front side of the front surface of the panel P (the front side of FIG. 1).

(Configurations of Feed Reel and Take-Up Reel)

The feed reel 11 is configured in such a way that the magnetic tape MT with a product width into which a wide original web is cut is set to a pancake for large diameter winding, and fed when the servo signal is written.

The magnetic tape MT fed from the feed reel 1 is guided by the guide rollers 19 and the grooved guide rollers 18 and sent to the servo signal writing head 16.

Then, the magnetic tape MT which has passed the servo signal writing head 16 is guided by the grooved guide rollers 18 and the guide rollers 19 and sent to the take-up reel 12.

The take-up reel 12 is configured to be driven to rotate by the driver 14 to thereby take up the magnetic tape MT which has passed the servo signal writing head 16.

(Configuration of Driver)

The driver 14 is a device for driving the take-up reel 12 to rotate, and includes a motor, a motor driving circuit for supplying current to the motor, a gear for connecting an axis of motor and the take-up reel 12, and the like, all of which are not shown.

The driver 14 is configured in such a way that motor current is generated in the motor driving circuit based on a motor current signal from the controller 17, and the motor current is supplied to the motor, whereby a rotational driving force of the motor is transmitted to the take-up reel 12 via the gear to drive the take-up reel 12 to rotate.

In addition, the feed reel 11, the take-up reel 12, and the driver 14 described above correspond to a "magnetic tape transport system" described in Claims.

(Configuration of Tension Adjuster)

The tension adjuster 13 is a device for providing a longitudinal directional tension to the magnetic tape MT to prevent the traveling magnetic tape MT from swaying, and provided on each of the upstream and downstream sides of the servo signal writing head 16. The tension adjuster 13 is a well-known air chamber for vacuuming air near a tape surface of the traveling magnetic tape MT to draw in a part of the magnetic tape MT and thereby providing the longitudinal directional tension to the magnetic tape MT, for instance.

(Configuration of Pulse Generating Circuit)

The pulse generating circuit 15 is a circuit for supplying writing pulse current to the servo signal writing head 16, and includes various electronic parts.

In the pulse generating circuit 15, the writing pulse current is generated based on a pulse control signal from the controller 17. Then, the pulse generating circuit 15 supplies the writing pulse current to a coil (not shown) of the servo signal writing head 16.

(Configuration of Servo Signal Writing Head)

Figure 2:
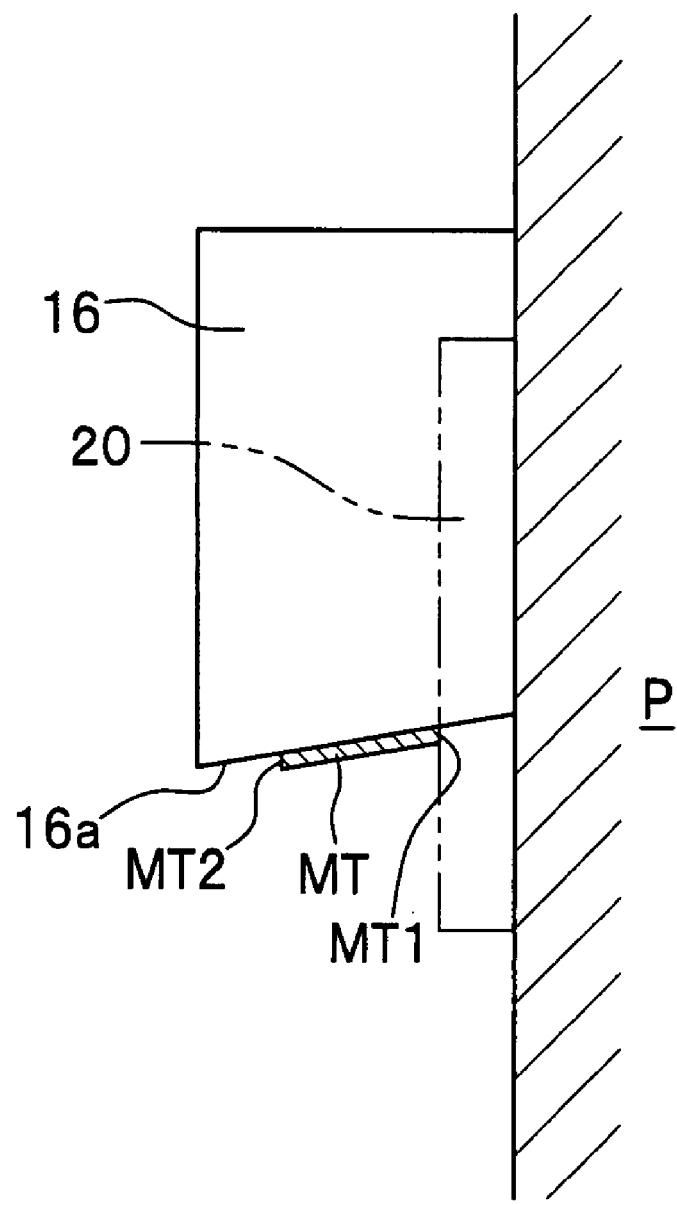
FIG. 2 is a side view illustrating a servo signal writing head of the embodiment.

FIG. 2 is a side view illustrating the servo signal writing head of the embodiment.

The servo signal writing head 16 is a magnetic head for writing the servo signal on the servo band of the magnetic tape MT, and includes the coil (not shown) for generating a magnetic flux. In addition, a head gap (not shown) is formed in the servo signal writing head 16.

In the servo signal writing head 16, a plurality of head gaps are arranged in a line, correspondingly to the positions of the respective servo bands in the width direction of the magnetic tape MT.

Also, the servo signal writing head 16 has a sliding surface 16a on which the traveling magnetic tape MT slides, as shown in FIG. 2. The sliding surface 16a is sloped in such a way that it protrudes downward on the outer side (on the left side in FIG. 2) with respect to the panel P side (on the right side in FIG. 2).

(Configurations of Guide Rollers)

The grooved guide rollers 18 and the guide rollers 19 are arranged between the feed reel 11 and the take-up reel 12 in such a way that the traveling magnetic tape MT is sent in a predetermined direction, and are configured to guide the traveling magnetic tape MT by the two grooved guide rollers 18 and a plurality of guide rollers 19.

A "guide rollers" described in Claims is the grooved guide roller 18, and the other guide rollers 19 are well-known guide rollers for guiding the magnetic tape MT, so that their description is omitted in the embodiment.

(Configuration of Grooved Guide Roller)

Figure 4A:
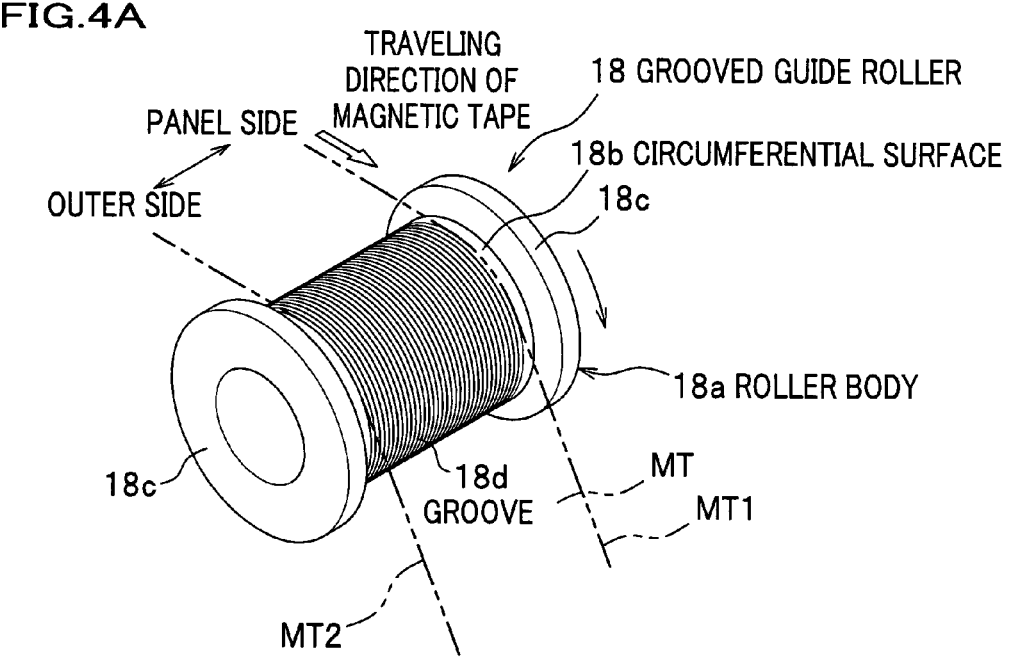
FIG. 4A is a perspective view illustrating a grooved guide roller of the embodiment.
Figure 4B:
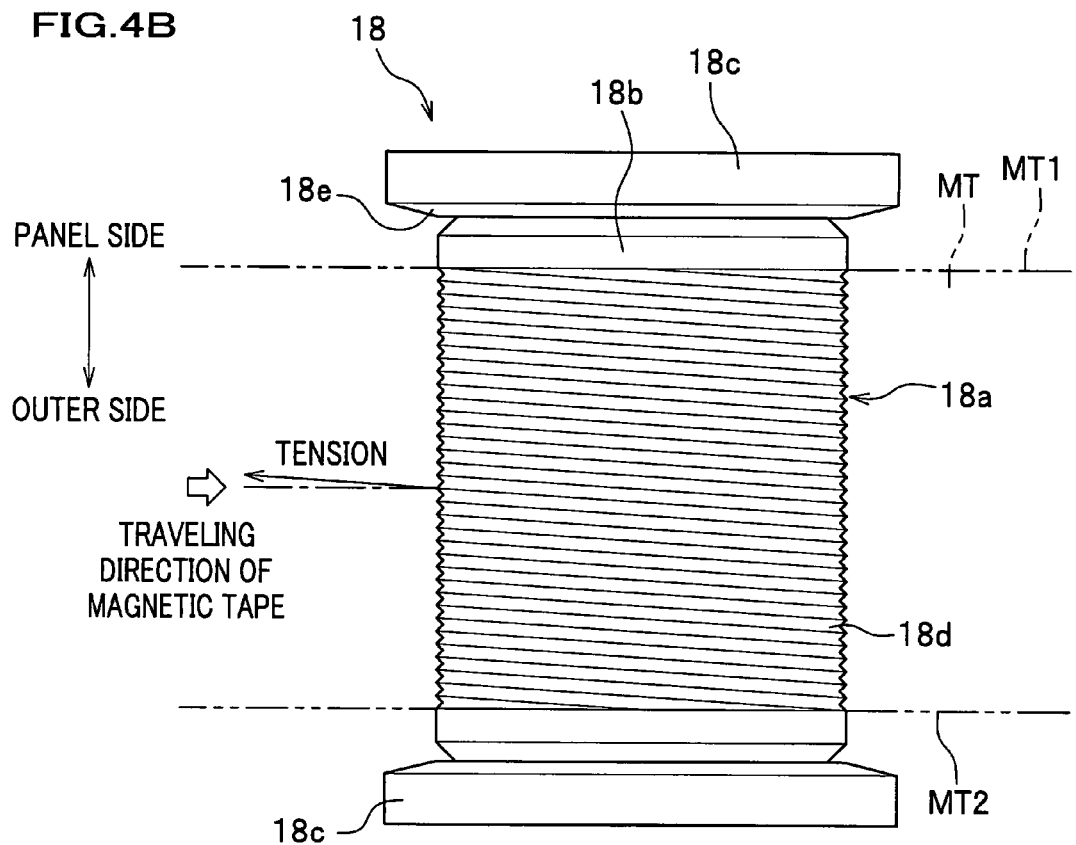
FIG. 4B is a plan view illustrating the grooved guide roller of the embodiment.

FIG. 3 is a plan view illustrating a tape guiding mechanism of the embodiment. FIG. 4A is a perspective view illustrating a grooved guide roller of the embodiment. FIG. 4B is a plan view illustrating the grooved guide roller of the embodiment.

In the embodiment, as shown in FIG. 3, the two grooved guide rollers 18 are respectively arranged on the upstream and downstream sides of the servo signal writing head 16. In addition, the respective grooved guide rollers 18 have the same configuration, so that only the grooved guide roller 18 on the upstream side is described, and the description of the grooved guide roller 18 on the downstream side is omitted in the embodiment.

The grooved guide roller 18 includes a cylindrical roller body 18a, which is configured to be fit outside of an axis part 30 protruded in a horizontal direction from the panel P to thereby freely rotate around the axis along the traveling direction of the magnetic tape. Also, it is configured to guide the traveling magnetic tape MT by bringing the tape surface of the magnetic tape MT into contact with a circumferential surface 18b of the roller body 18a.

Furthermore, as shown in FIG. 4, at both edges of the circumferential surface 18b of the roller body 18a in its width direction, flange parts 18c are raised over the whole circumference. In addition, materials for the roller body 18a are not limited; however, it is desirable that such materials can prevent damage of the magnetic tape MT by DLC (Diamond like Carbon) processing of a part with which the magnetic tape MT comes into contact to thereby improve abrasion resistance of its surface and smooth the surface.

Still furthermore, on the circumferential surface 18b of the roller body 18a, a groove 18d is formed around the axis of the roller body 18a. The groove 18d is formed in a spiral manner, which looks as sloped lines from upper left to lower right in the plan view shown in FIG. 4B. Also, a cross-sectional shape of the groove 18d in the width direction of the circumferential surface 18b is V-shaped.

In this configuration, when the grooved guide roller 18 guides the magnetic tape MT, accompanying air intruding between the magnetic tape MT and the roller body 18a is discharged outside through the groove 18d, and therefore the tape surface of the traveling magnetic tape MT is drawn onto the circumferential surface 18b of the roller body 18a and comes into contact with the same.

When the traveling magnetic tape MT and the roller body 18a freely rotating around the axis are in contact with each other, delay in a rotational speed of the roller body 18a occurs, relative to a traveling speed of the magnetic tape MT. This causes a slip between the tape surface of the magnetic tape MT and the circumferential surface 18b of the roller body 18a, and a frictional resistance force therebetween causes a tension to act on the magnetic tape MT from the roller body 18a, backward in the traveling direction of the magnetic tape.

As described above, the groove 18d on the circumferential surface 18b of the roller body 18a is formed around the axis of the roller body 18a in a spiral manner, and on the circumferential surface 18b, a part that comes into contact with the magnetic tape MT other than the groove 18d is also formed along the groove 18d in a spiral manner, so that the tension acting on the magnetic tape MT from the roller body 18a acts obliquely with respect to the traveling direction of the magnetic tape along a slope direction of the groove 18d, and the traveling magnetic tape MT shifts to one side in the width direction on the circumferential surface 18b of the roller body 18a.

Specifically, the tension acts on the magnetic tape MT from the roller body 18a, backward in the traveling direction of the magnetic tape, and the force from lower right to upper left is applied in the plan view of FIG. 4B. The tension causes the magnetic tape MT to shift to the panel P side on the circumferential surface 18b.

(Configuration of Regulator)

Figure 5:
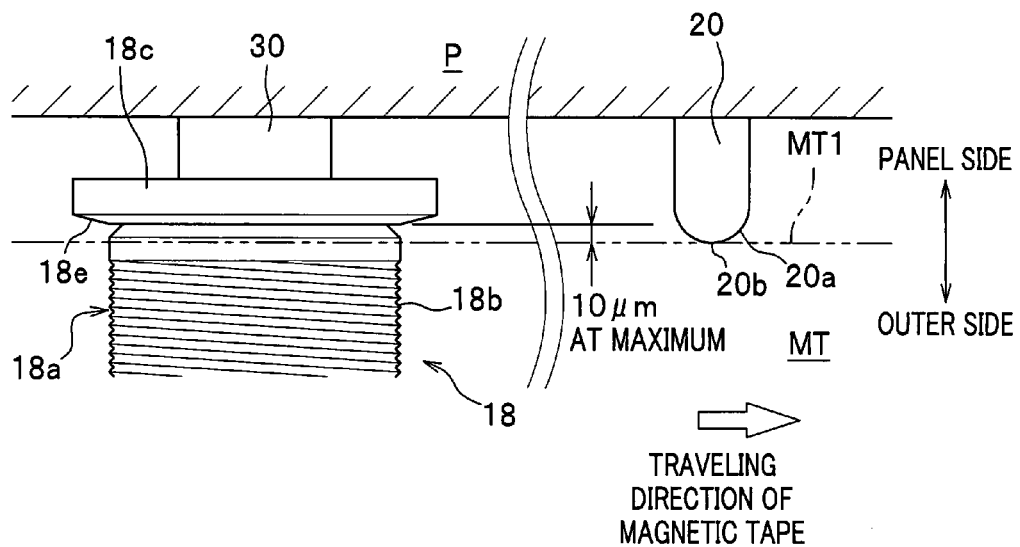
FIG. 5 is a configuration diagram illustrating a positional relationship between the regulator and the grooved guide roller in the embodiment.

FIG. 5 is a configuration diagram illustrating a positional relationship between the regulator and the grooved guide roller in the embodiment.

The regulator 20 is a member for positioning the traveling magnetic tape MT, and in the embodiment, the two regulators 20 are respectively arranged on the upstream and downstream sides of the servo signal writing head 16 as shown in FIG. 3. Specifically, each of the two regulators 20 is arranged between the grooved guide roller 18 and the servo signal writing head 16 and near the servo signal writing head 16. In addition, both of the regulators 20 have the same configuration, so that only the regulator 20 on the upstream side is described and the description of the regulator 20 on the downstream side is omitted in the embodiment.

The regulator 20 is a bar-like ceramic material, and is mounted on the front surface of the panel P in a state where its axial direction is arranged in the direction perpendicular to the panel P. In the embodiment, high-strength zirconia is used as the ceramic material. Also, an outer end surface 20a of the regulator 20 (on the lower side in FIG. 3) is a convex curved surface.

Then, as shown in FIG. 5, a top part 20b of the end face 20a outside the regulator 20 is protruded outward within the maximum range of 10 μm with respect to a level of an inner surface 18e of the flange part 18c on the panel P side of the grooved guide roller 18. For this reason, if the traveling magnetic tape MT shifts to the panel P side on the circumferential surface 18b of the roller body 18a of the grooved guide roller 18, an edge MT1 on the panel P side of the magnetic tape MT is pressed by the outer end surface 20a of the regulator 20, and therefore the magnetic tape MT travels while sliding on the regulator 20.

In addition, under the condition that the edge MT1 on the panel P side of the traveling magnetic tape MT rubs against the regulator 20, the servo signal is configured to be written on an appropriate position of the magnetic tape MT by the servo signal writing head 16.

Also, regarding the regulator 20, the outer end surface 20a against which the edge MT1 of the traveling magnetic tape MT rubs is formed in the convex curved surface, and furthermore, for the regulator 20, the ceramic material that is not as hard as a steel material is used, so that damage of the edge MT1 of the magnetic tape MT can be prevented.

(Configuration of Controller)

The controller 17 is a device for controlling operations of respective parts of the servo writer 10, and includes a CPU (Central Processing Unit), various storage units, and the like.

The controller 17 is configured to generate the motor current signal for controlling the motor current for the driver 14 and send the generated motor current signal to the driver 14, in order to keep a traveling speed of the magnetic tape MT constant in writing the servo signal.

Also, the controller 17 is configured to generate the pulse control signal for controlling a current value, a pulse width, and a generation timing of the writing pulse current, and send the generated pulse control signal to the pulse generating circuit 15, in such a way that the servo signal to be written on the magnetic tape MT by the servo signal writing head 16 has a predetermined servo pattern.

[Method for Manufacturing Magnetic Tape]

Next, the method for manufacturing the magnetic tape MT with the use of the servo writer 10 described above will be described.

First, as shown in FIG. 1, the pancake-like magnetic tape MT is set as the feed reel 11 of the servo writer 10, and a tip of the magnetic tape MT is pulled out. The tip of the magnetic tape MT is connected to a winding core of the take-up reel 12 through the guide rollers 18 and 19.

The take-up reel 12 is rotated with the use of the driver 14 in this condition. Consequently, the take-up reel 12 takes up the magnetic tape MT to cause the magnetic tape MT to travel from the feed reel 11 to the take-up reel 12. Also, drawing in the traveling magnetic tape MT in the tension adjuster 13, and thereby providing a longitudinal directional tension to the traveling magnetic tape MT prevent the traveling magnetic tape MT from swaying.

Further, as shown in FIG. 4, the slip occurs between the tape surface of the traveling magnetic tape MT and the circumferential surface 18b of the roller body 18a of the grooved guide roller 18, and the frictional resistance force therebetween causes the tension to act on the magnetic tape MT from the roller body 18a, backward in the traveling direction of the magnetic tape, and the force from lower right to upper left is applied in the plan view of FIG. 4B. The tension causes the traveling magnetic tape MT to shift to the panel P side on the circumferential surface 18b.

At this time, the sliding surface 16a (see FIG. 2) of the servo signal writing head 16 is sloped in such a way that it protrudes downward on the outer side (on the left side in FIG. 2) with respect to the panel P side (on the right side of FIG. 2), and therefore the traveling magnetic tape MT is likely to shift to the panel P side in the width direction on the sliding surface 16a. That is, the traveling magnetic tape MT is likely to shift to the respective regulator 20 sides.

As shown in FIG. 3, this causes the edge MT1 on the panel P side of the magnetic tape MT to be surely pressed by the respective regulators 20, and thereby the traveling magnetic tape MT is positioned, so that the magnetic tape MT can linearly and stably travel in a position appropriate to the servo signal writing head 16.

Thus, on the magnetic tape MT positioned by the respective regulators 20, the servo signal is accurately written by the servo signal writing head 16.

Specifically, the writing pulse current is supplied to the coils for the head gaps of the servo signal writing head 16 from the pulse generating circuit 15, based on the pulse control signal from the controller 17. When the writing pulse current is supplied to the servo signal writing head 16 from the pulse generating circuit 15, magnetic flux leaked from the head gaps of the servo signal writing head 16 magnetizes a magnetic layer of the magnetic tape MT to thereby form the servo patterns on the servo bands of the magnetic tape MT.

The magnetic tape MT on which the servo signals are written is taken up by the take-up reel 12, and then cut into tapes with a length corresponding to a product specification, which are subsequently housed in cartridge cases, or the like (not shown).

Meanwhile, when the magnetic tape MT travels, an edge of the traveling magnetic tape MT scrapes against a part of the tension adjuster 13, causing vibrations in the magnetic tape MT.

In the case of the grooved guide roller 18 shown in FIG. 4, the accompanying air intruding between the traveling magnetic tape MT and the roller body 18a is discharged outside through the groove 18d formed on the circumferential surface 18b of the roller body 18a, whereby the traveling magnetic tape MT comes into contact with the circumferential surface 18b of the roller body 18a, so that propagation of vibrations which occur in the magnetic tape MT can be prevented and the effect of vibrations on writing of the servo signal can also be prevented.

As described above, the servo writer 10 (see FIG. 1) employing the tape guiding mechanism including the grooved guide rollers 18 and the regulators 20 can accurately write the servo signal on the magnetic tape MT, so that the high-quality magnetic tape MT can be manufactured.

Other Embodiments

The embodiment of the present invention has been described above. However, the present invention is not limited to the above-described embodiment. For example, in the grooved guide roller 18 shown in FIG. 4, the groove 18d having a V-shaped cross-section is formed on the circumferential surface 18b of the roller body 18a. However, the cross-sectional shape of the groove 18d is not limited to this, but a groove whose cross-sectional shape is a rectangular, a semicircular, or the like may be formed. Moreover, a cross-sectional area of the groove 18d in its width direction is not limited, but it is only necessary for the area to have a sufficient size enabling the accompanying air intruding between the traveling magnetic tape MT and the roller body 18a to be discharged outside.

Figure 6:
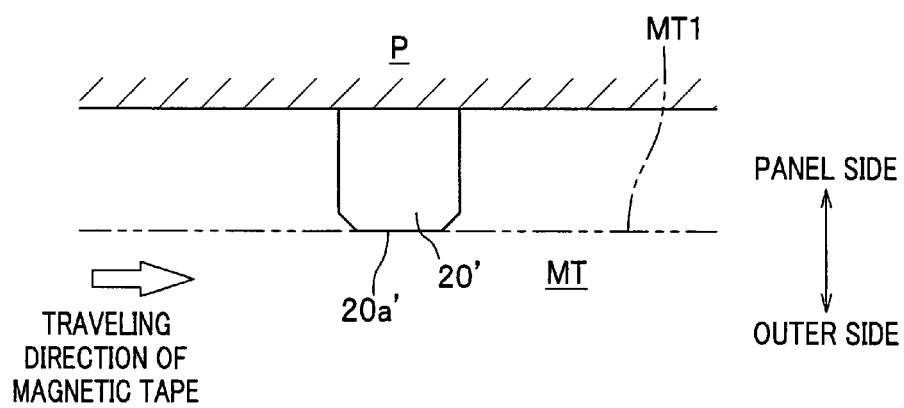
FIG. 6 is a diagram illustrating a regulator in another embodiment, and is a plan view for the case where an outer end surface is formed flat.

Moreover, as shown in FIG. 5, in the above-described embodiment, the outer end surface 20a of the regulator 20 is the convex curved surface; however, the shape is not limited, and a regulator 20' whose outer end surface 20a' is formed flat along the traveling direction of the magnetic tape as shown in FIG. 6 may be used. In this configuration, a sliding distance of the edge MT1 of the traveling magnetic tape MT on the regulator 20' becomes longer, compared with the case where the outer end surface 20a is the convex curved surface as the above-described regulator 20 shown in FIG. 5, so that stability of the traveling magnetic tape MT can be improved. In addition, corners of the regulator 20' on the upstream and downstream sides in the traveling direction of the magnetic tape are chamfered, and thereby damage of the traveling magnetic tape MT is prevented. However, the corners may be rounded, or if the magnetic tape MT is not damaged, the corners may be unprocessed.

Furthermore, as shown in FIG. 3, in the above-described embodiment, the grooved guide roller 18 is arranged on each of the upstream and downstream sides of the servo signal writing head 16. However, it is only necessary to arrange it on at least one of the upstream and downstream sides, and for example, such a configuration may be employed that as shown in FIG. 7A, the grooved guide roller 18 is arranged on the upstream side of the servo signal writing head 16 and a guide roller 22 without a groove is arranged on the downstream side of the servo signal writing head 16 to thereby guide the traveling magnetic tape MT. In this configuration, forming a plurality of air blow-off holes 22b on a circumferential surface 22a of the guide roller 22 without a groove, making air blow off through each of the blow-off holes 22b, and guiding the magnetic tape MT while floating it above the circumferential surface 22a prevent damage of the magnetic tape MT.

In addition, as shown in FIG. 7B, on the downstream side of the servo signal writing head 16, a circumferential surface 23a of a columnar guide pole 23 horizontally protruded from the panel P may also guide the traveling magnetic tape MT. For the guide pole 23, a ceramic material is desirably used to prevent damage of the magnetic tape MT, and high-strength zirconia is more desirably used.

Moreover, applying the grooved guide roller 18 to the other guide roller 19 enables the magnetic tape MT to stably travel in each place in the servo writer 10 as well as prevents propagation of vibrations which occur in the magnetic tape MT.

Such a configuration may be employed that a tension acts on the magnetic tape MT from the grooved guide roller 18, forward in the traveling direction, by providing a driver for the grooved guide roller 18 to thereby increase the rotational speed of the grooved guide roller 18, with respect to the traveling speed of the magnetic tape MT.

Figure 8:
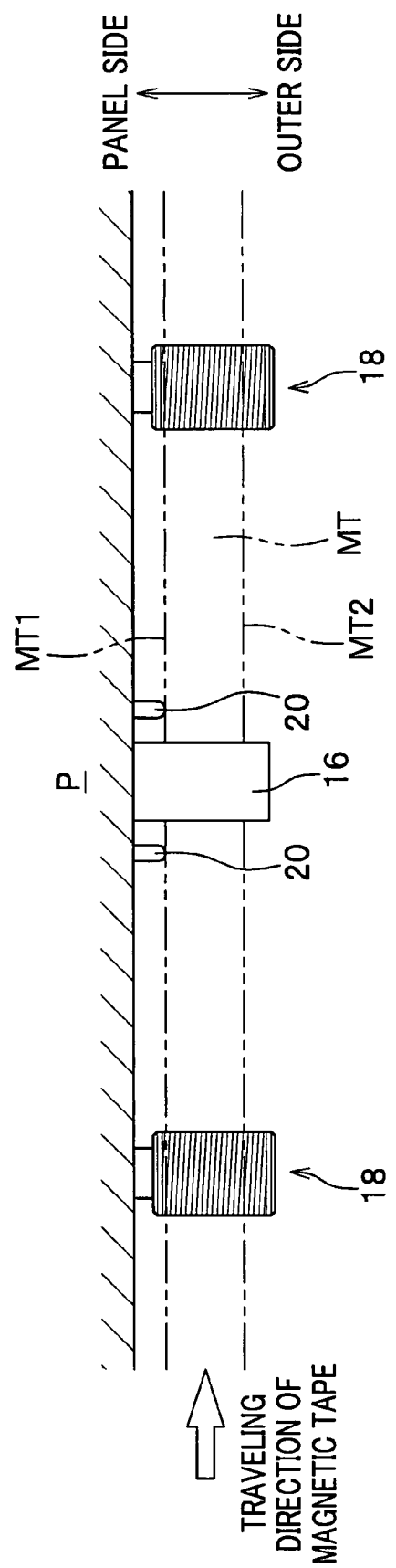
FIG. 8 is a diagram illustrating a tape guiding mechanism in another embodiment, and is a plan view for the case where a grooved guide roller without a flange part is used.

Furthermore, as shown in FIG. 5, in the above-described embodiment, the traveling magnetic tape MT is positioned by the respective regulators 20, without rubbing against the flange part 18c of any of the grooved guide rollers 18, so that as shown in FIG. 8, the grooved guide roller 18 may be provided without the flange part.

In addition, in the above-described embodiment, as shown in FIG. 3, the two regulators 20 are respectively arranged on the upstream and downstream sides of the servo signal writing head 16. It is desirable to narrow an interval between the respective regulators 20 to bring them close to the servo signal writing head 16. Hence, the magnetic tape MT travels stably when the magnetic tape MT passes the servo signal writing head 16.

Moreover, in the above-described embodiment, as shown in FIG. 2, the sliding surface 16a of the servo signal writing head 16 is sloped, and an angle of the slope is specified in accordance with properties of the magnetic tape MT which travels on the sliding surface 16a. However, the angle is preferably 0.8 degree at maximum. In addition, the sliding surface 16a of the servo signal writing head 16 may be horizontally formed, without being sloped.

Furthermore, in the above-described embodiment, the tension adjuster 13 employs the air chamber for providing the longitudinal directional tension to the magnetic tape MT by vacuuming a portion of the traveling magnetic tape MT. However, its configuration is not limited, but may be made in such a way that the longitudinal directional tension is provided to the magnetic tape MT by moving a tension roller, on which the magnetic tape MT travels, to thereby draw in a portion of the magnetic tape MT.

Figure 9:
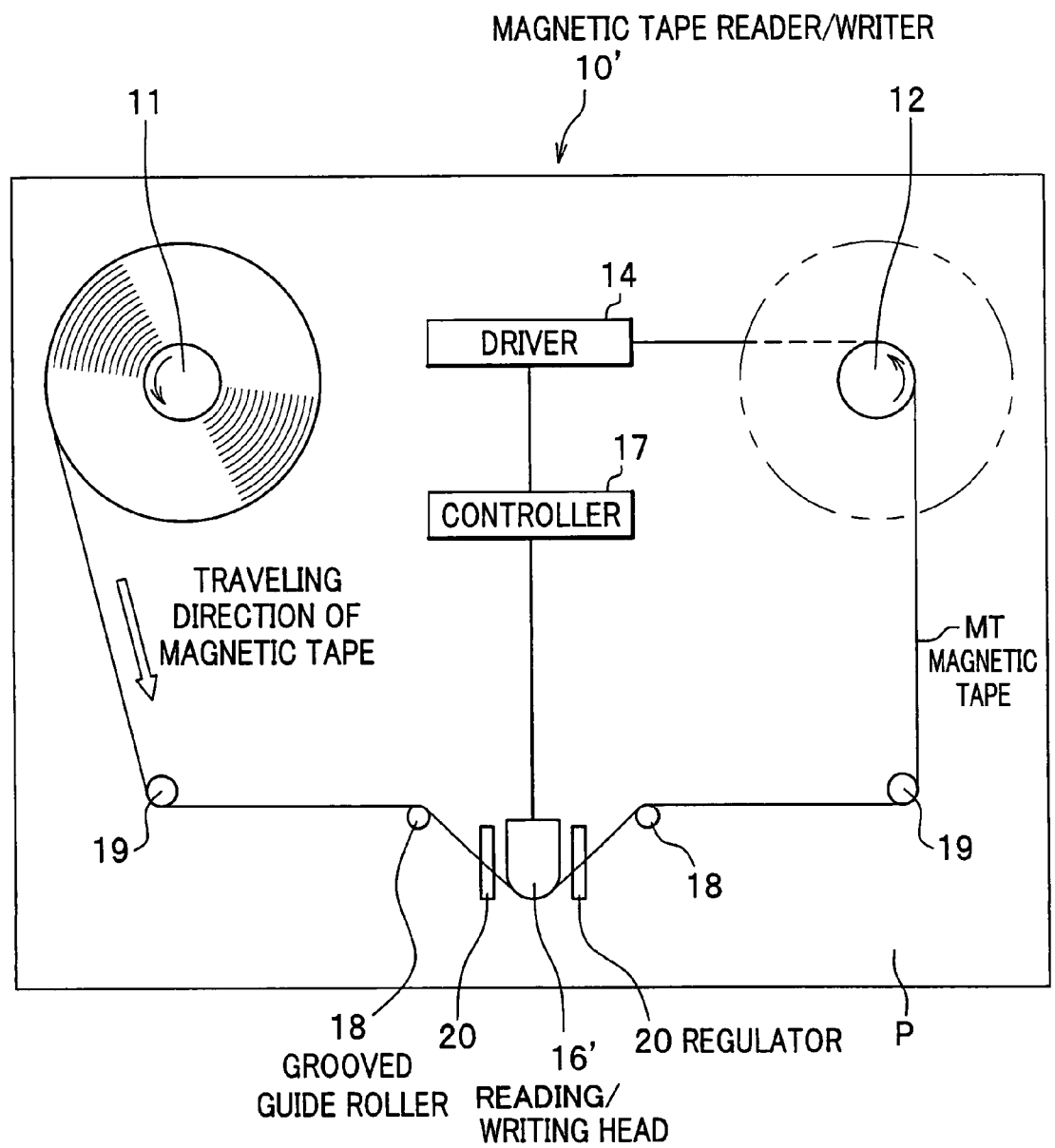
FIG. 9 is a configuration diagram illustrating a magnetic tape reading/writing apparatus of another embodiment.
Figure 10:
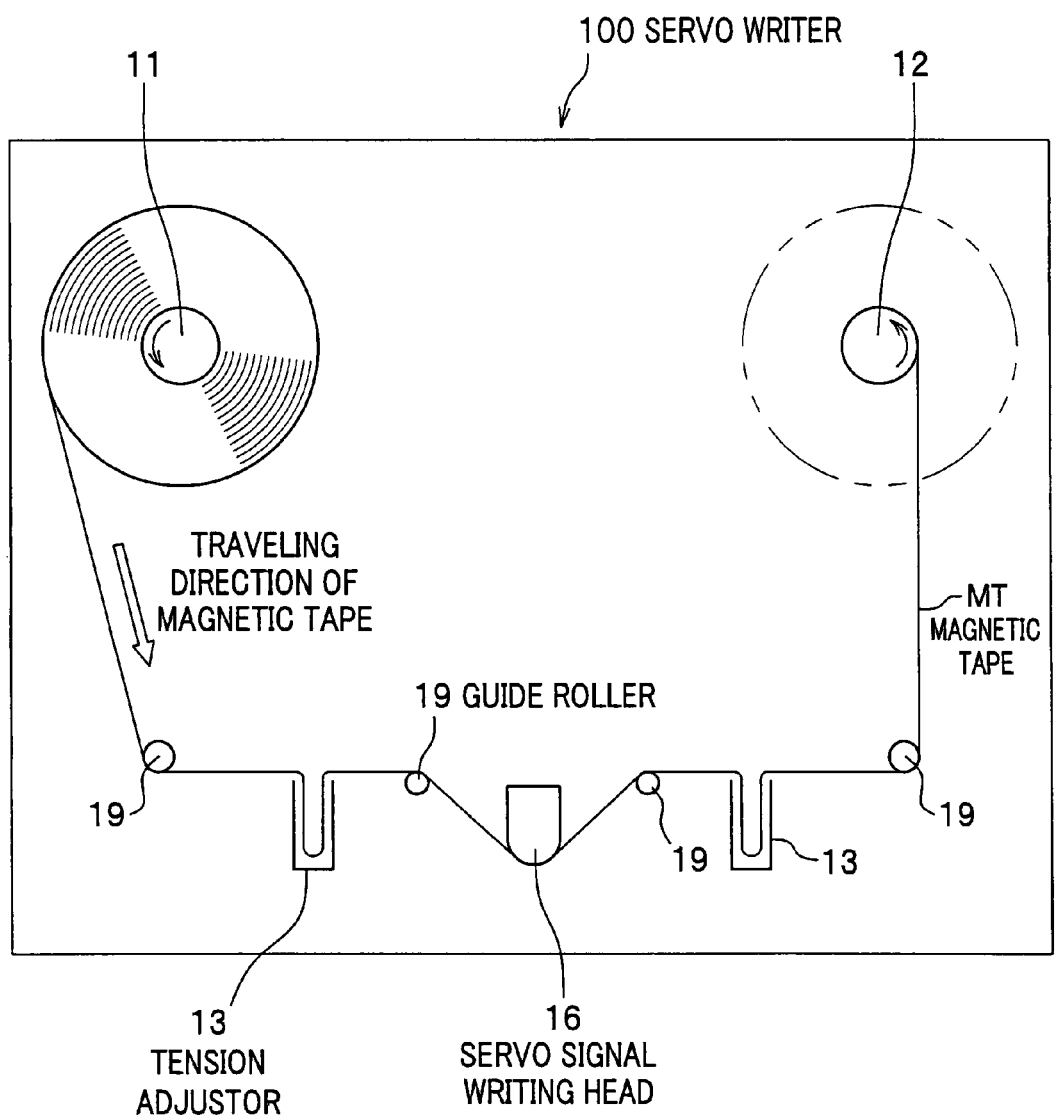
FIG. 10 is a configuration diagram illustrating the conventional servo writer.

Still furthermore, in the above-described embodiments, description has been given to the case where the present invention is applied to the servo writer 10 for writing the servo signal on the magnetic tape MT as shown in FIG. 1. However, the present invention may be applied to various kinds of magnetic tape apparatus. FIG. 9 shows the case where the present invention is applied to a magnetic tape reading/writing apparatus, and by using the above-described tape guiding mechanism, the magnetic tape reader/writer 10' enables the magnetic tape MT to linearly and stably travel in a position appropriate to a reading/writing head 16'. Also, propagation of vibrations which occur in the magnetic tape MT can be prevented, so that the effect of vibrations on reading or writing by the reading/writing head 16' can be prevented. Accordingly, data can be written on the magnetic tape MT in a good writing condition, or data can be accurately read from the magnetic tape MT.

The tape guiding mechanism according to the present invention allows the tape to shift to one side in the width direction on the circumferential surface of the guide roller, and thereby the edge of the tape is pressed by the regulator, so that the traveling tape can be positioned in the appropriate position and thereby the tape can stably travel in the appropriate position. Also, the accompanying air intruding between the tape and the guide roller is discharged outside through the groove formed on the circumferential surface of the guide roller and thereby the traveling tape comes into contact with the guide roller, so that propagation of vibrations which occur in the tape can be prevented.

The magnetic tape apparatus according to the present invention allows the traveling magnetic tape to shift to one side in the width direction, whereby the edge of the magnetic tape is pressed by the regulator and thereby the traveling magnetic tape is positioned, so that the magnetic tape can linearly and stably travel in the position appropriate to the magnetic head. Also, propagation of vibrations which occur in the magnetic tape can be prevented, so that the effect of vibrations on reading or writing by the magnetic head can be prevented. Accordingly, the magnetic tape apparatus of the present invention enables a signal or data to be written on the magnetic tape in a good writing condition, or a signal or data to be accurately read from the magnetic tape.

The method for manufacturing a magnetic tape according to the present invention allows the traveling magnetic tape to shift to one side in the width direction, whereby the edge of the magnetic tape is pressed by the regulator and thereby the traveling magnetic tape is positioned, so that the magnetic tape can linearly and stably travel in the position appropriate to the servo signal writing head. Also, propagation of vibrations which occur in the magnetic tape can be prevented, so that the effect of vibrations on writing of the servo signal can be prevented. Accordingly, the method for manufacturing a magnetic tape according to the present invention enables the servo signal to be accurately written on the magnetic tape and the high-quality magnetic tape to be manufactured.

While the described embodiments represent the preferred forms of the present invention, it is to be distinctly understood that the invention is not limited thereto but may be otherwise variously embodied within the spirit and scope of the following claims.

What is claimed is:

1. A tape guiding mechanism for guiding a traveling tape, comprising:
   a guide roller for guiding the traveling tape;
   a magnetic head for reading and/or writing the traveling magnetic tape; and
   a regulator which rubs against at least one edge of the traveling tape in a width direction of the traveling tape,
   wherein the magnetic head comprises a sliding surface on which the traveling magnetic tape slides, and the sliding surface is sloped in such a way that another side of the sliding surface protrudes with respect to the one side in the width direction of the magnetic tape, and
   wherein the guide roller comprises a circumferential surface with which the traveling tape is in contact, a spiral groove is formed on the circumferential surface around an axis of the guide roller, and the traveling tape shifts to one side in the width direction on the circumferential surface of the guide roller.

2. A magnetic tape apparatus for reading and/or writing a magnetic tape, comprising:
   a magnetic tape transport system in which a take-up reel takes up the magnetic tape fed from a feed reel, to cause the magnetic tape to travel;
   a magnetic head for reading and/or writing the traveling magnetic tape; and
   a tape guiding mechanism for guiding the traveling magnetic tape, comprising a guide roller for guiding the traveling magnetic tape, and a regulator which rubs against at least one edge of the traveling tape in a width direction of the traveling magnetic tape,
   wherein the magnetic head comprises a sliding surface on which the traveling magnetic tape slides, and the sliding surface is sloped in such a way that another side of the sliding surface protrudes with respect to the one side in the width direction of the magnetic tape,
   wherein the guide roller comprises a circumferential surface with which the traveling tape is in contact, a spiral groove is formed on the circumferential surface around an axis of the guide roller, the spiral groove being adapted to cause the traveling magnetic tape to shift to one side in the width direction on the circumferential surface of the guide roller, and
   wherein the regulator is provided between the guide roller and the magnetic head.

3. A method for manufacturing a magnetic tape using a servo writer comprising:
   a magnetic tape transport system in which a take-up reel takes up the magnetic tape fed from a feed reel, to cause the magnetic tape to travel;
   a servo signal writing head for writing a servo signal for performing a tracking control of a magnetic head; and
   a tape guiding mechanism for guiding the traveling magnetic tape, comprising a guide roller for guiding the traveling magnetic tape, and a regulator which rubs against at least one edge of the traveling tape in a width direction of the traveling magnetic tape,
   wherein the servo signal writing head comprises a sliding surface on which the traveling magnetic tape slides, and the sliding surface is sloped in such a way that another side of the sliding surface protrudes with respect to the one side in the width direction of the magnetic tape,
   wherein the guide roller comprises a circumferential surface with which the traveling tape is in contact, a spiral groove is formed on the circumferential surface around an axis of the guide roller, the spiral groove being adapted to cause the traveling magnetic tape to shift to one side in the width direction on the circumferential surface of the guide roller, and
   wherein the regulator is provided between the guide roller and the servo signal writing head,
   the method comprising the steps of:
   making the magnetic tape travel from the feed reel to the take-up reel by the magnetic tape transport system; and
   writing a servo signal on a servo band of the magnetic tape by the servo signal writing head while guiding the traveling magnetic tape by the tape guiding mechanism.

4. The tape guiding mechanism as claimed in claim 1, wherein the regulator is formed in a bar-like shape, and wherein an outer end surface of the regulator is a convex curved surface.

5. The tape guiding mechanism as claimed in claim 4, wherein the regulator is made of ceramic.

6. The tape guiding mechanism as claimed in claim 4, wherein the regulator is made of zirconia.

7. The tape guiding mechanism as claimed in claim 1, wherein an outer end surface of the regulator is formed flat along a traveling direction of the magnetic tape.

8. The tape guiding mechanism as claimed in claim 1, wherein a cross-sectional shape of the groove in the guide roller is V-shaped.

9. The tape guiding mechanism as claimed in claim 1, wherein a cross-sectional shape of the groove in the guide roller is a rectangular.

10. The tape guiding mechanism as claimed in claim 1, wherein a cross-sectional shape of the groove in the guide roller is a semicircular.

11. The magnetic tape apparatus as claimed in claim 2, wherein the sliding surface of the magnetic head is sloped to cause the traveling magnetic tape to shift to a side of the regulator.

12. The magnetic tape apparatus as claimed in claim 11, wherein an angle of the sloped sliding surface of the magnetic head is 0.8 degree at a maximum.

13. A tape guiding mechanism for guiding a traveling tape, comprising:
   a guide roller for guiding the traveling tape;
   a magnetic head from reading and/or writing the traveling magnetic tape; and
   a regulator which rubs against at least one edge of the traveling tape in its width direction,
   wherein the magnetic head comprises a sliding surface on which the traveling magnetic tape slides, and the sliding surface is sloped in such a way that another side of the sliding surface protrudes with respect to the one side in the width direction of the magnetic tape, and
   wherein the guide roller comprises a circumferential surface with which the tape is in contact, and a plurality of air blow-off holes are formed on the circumferential surface around an axis of the guide roller.

14. The tape guiding mechanism of claim 1, wherein the regulator rubs against only a single edge of the tape as the sloped surface of the head slides the single edge towards the regulator.

* * * * *